(12) United States Patent
Bender et al.

(10) Patent No.: US 6,524,996 B1
(45) Date of Patent: Feb. 25, 2003

(54) SPINEL MONOLITH CATALYST AND PREPARATION THEREOF

(75) Inventors: Michael Bender, Ludwigshafen (DE); Otto Kumberger, Mannheim (DE); Michael Hesse, Worms (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 80 days.

(21) Appl. No.: 09/688,881

(22) Filed: Oct. 17, 2000

(30) Foreign Application Priority Data

Oct. 19, 1999 (DE) .......................... 199 50 325

(51) Int. Cl.⁷ .............................. B01J 23/70
(52) U.S. Cl. ...................... 502/346; 502/524
(58) Field of Search ................. 502/353, 345, 502/346, 325, 337, 338, 324, 319, 340, 341, 342, 343, 349, 304, 352, 350, 351, 321, 318, 322, 355, 303

(56) References Cited

U.S. PATENT DOCUMENTS

| | | | |
|---|---|---|---|
| 4,814,153 A | | 3/1989 | Kobayashi et al. .......... 423/213 |
| 4,985,387 A | * | 1/1991 | Prigent et al. ............ 423/213.5 |
| 5,182,249 A | * | 1/1993 | Wang et al. .............. 423/213.2 |
| 5,736,114 A | | 4/1998 | Barthe et al. ................ 428/213 |
| 5,876,681 A | | 3/1999 | Barthe et al. ................ 423/237 |
| 5,883,041 A | * | 3/1999 | Pak et al. .................... 502/325 |
| 5,905,056 A | | 5/1999 | Hartweg et al. ............. 502/524 |
| 5,965,099 A | | 10/1999 | Hartweg et al. ............. 423/213 |
| 6,004,520 A | | 12/1999 | Hartweg et al. ............. 423/213 |

FOREIGN PATENT DOCUMENTS

| | | |
|---|---|---|
| DE | 36 19 337 | 12/1986 |
| DE | 195 46 482 | 5/1997 |
| EP | 676 232 | 10/1995 |
| EP | 779 093 | 6/1997 |

* cited by examiner

*Primary Examiner*—Stanley S. Silverman
*Assistant Examiner*—Edward M. Johnson
(74) *Attorney, Agent, or Firm*—Keil & Weinkauf

(57) ABSTRACT

The spinel monolith catalyst is obtainable by a) preparing or coating a molding, especially a monolith, with an at least surfacial active composition comprising a spinel of the general formula (I)

$$A_xB_{(1-x)}E_2O_4 \qquad (I)$$

where
A is Cu, of which up to half may be replaced by Co, Fe, Ni, Mn or Cr,
B is at least one element selected from the group consisting of Zn, Mg, Ca, Zr, Ce, Sn, Ti, V, Mo and W,
E is Al, of which up to half may be replaced by $Fe_2O_3$, $Cr_2O_3$, $Ga_2O_3$, $La_2O_3$ or mixtures thereof,
x is from 0 to 1, preferably 0 to 0.9, b) impregnating the monolith with a solution of at least one compound of elements of transition group 5 of the periodic table or adding these elements in step a) in the form of their oxides or salts, c) drying and optionally calcining.

9 Claims, No Drawings

SPINEL MONOLITH CATALYST AND PREPARATION THEREOF

This invention relates to spinel monolith catalysts, to processes for their preparation and to their use for reducing $NO_x$ in combustion exit gases.

The combustion of hydrocarbons with air as oxidant gives rise, particularly with excess air and high temperatures, to nitrogen oxides through oxidation of the nitrogen present in the air. Examples of such nitrogen oxides are NO, $NO_2$, $NO_3$, $N_2O_3$, $N_2O_4$ and $N_2O_5$. Being pollutants, the nitrogen oxides should be removed as completely as possible from the combustion exit gases to avoid burdening the environment. Whereas power plant and industrial emissions are being progressively curtailed through the use of exit gas treatment facilities, abating the pollutant fraction in motor vehicle exit or exhaust gases is becoming more and more important, especially against the background of the increasing number of motor vehicles.

Many solutions have been proposed for abating $NO_x$ emissions from motor vehicle engines. Effective solutions for abating $NO_x$ levels have to meet a multiplicity of criteria, especially if catalysts are used, for example:

high conversion ratio, i.e., substantial $NO_x$ removal, even at high and low temperatures and in the event of frequent load changes during operation avoidance of the use of auxiliary materials such as ammonia or urea low manufacturing and operating costs long onstream time low $N_2O$ production high mechanical catalyst stability.

A number of catalysts have been proposed for reducing nitrogen oxides. One train in the development of suitable catalysts is moving in the direction of spinel catalysts.

The use of copper-impregnated $CuAl_2O_4$ spinels as exit gas catalyst is described in DE-A-195 46 482. The spinels are used in the form of spall.

EP-A-0 779 093 describes corresponding spinel catalysts for reducing nitrogen oxides and for oxidizing hydrocarbons. The spinels are based on zinc, copper and aluminum and are used in the form of spall.

EP-A-0 676 232 describes spinel catalysts useful for exit gas treatment, which abate nitrogen oxide levels in the exit gas. They are zinc aluminum spinels which are obtainable by precipitation from precursor solutions. The precipitation products can be dried by spray drying or flash evaporation of the solvent and are obtained as powders. It is also possible to mix the catalyst precursors with, for example, urea or glycine and to burn the mixture, in which case not only spinel formation but at the same time also, owing to the high temperature, a calcination takes place. It is stated that the catalysts can be present in the form of honeycombs, but a manufacturing process for honeycomb structures is not described.

Spinel catalysts are preferably used in motor vehicles not in the form of spall or granulate, but in the form of honeycomb structures which consist of the catalyst material and possess a number of essentially parallel channels through which the gas to be treated flows. In cross-sectional view, such honeycomb structures may correspond to honeybee combs, for example. The individual channels may also have a round or rectangular or especially square cross section, so that the cross section through the honeycomb structure corresponds to a right-angled grid pattern.

Various processes have been proposed for preparing spinel honeycomb structures.

DE-C-36 19 337 describes a process for preparing $TiO_2$—$SiO_2$ oxide compounds which may further contain zirconium dioxide. An aqueous solution comprising active constituents such as vanadium and copper, or a powder of the active constituents in the form of the oxides is added together with a molding assistant to a titanium-containing oxide, such as $TiO_2$, $TiO_2$—$SiO_2$ and $TiO_2$—$SiO_2$—$ZrO_2$. The constituents are then mixed and kneaded while a suitable amount of water is added. The mixture is then molded in an extruder molding apparatus. The molded product is dried and calcined.

The known catalysts do not provide sufficient catalytic $NO_x$ degradation in all applications.

It is an object of the present invention to provide spinel monolith catalysts that have an improved performance compared to known catalysts and more particularly provide improved catalytic $NO_x$ degradation.

We have found that this object is achieved according to the invention by a spinel monolith catalyst obtainable by a) preparing or coating a molding, especially a monolith, with an at least surfacial active composition comprising a spinel of the general formula (I)

$$A_xB_{(1-x)}E_2O_4 \qquad (I)$$

where

A is Cu, of which up to half may be replaced by Co, Fe, Ni, Mn or Cr,

B is at least one element selected from the group consisting of Zn, Mg, Ca, Zr, Ce, Sn, Ti, V, Mo and W, E is Al, of which up to half may be replaced by $Fe_2O_3$, $Cr_2O_3$, $Ga_2O_3$, $La_2O_3$ or mixtures thereof, x is from 0 to 1, preferably 0 to 0.9, b) impregnating the monolith with a solution of at least one compound of elements of transition group 5 of the periodic table or adding these elements in step a) in the form of their oxides or salts, for example by incorporation into the raw materials used, c) drying and optionally calcining. Preferred elements of transition group 5 of the periodic table are niobium (Nb), tantalum (Ta) and mixtures thereof.

The inventors found that the improved performance of the catalysts according to the invention is obtained only in the case of monoliths and not in the case of spall beds. Highly active catalysts are obtained specifically on impregnating spinel monoliths with these compounds with or without subsequent calcination.

Preference is given to using a spinel of the general formula (I) where

A is Cu

B is Zn, Zr, Mg or Ca, especially Zn or Mg

E is Al x is from 0 to 1, especially from 0.1 to 0.9

Useful spinels are described for example in DE-A-44 33 929, DE-A-195 46 481, DE-A-195 46 612, WO 97/21482, DE-A-196 53 200 and DE-A-198 13 171.

In one embodiment of the invention, the monolith is molded from spinel powder of the spinel of the general formula (I). Precursors of the spinel components can be used as may dopants. Preparation can be effected according to the process described above in the background art. Further useful processes are described in DE-A-44 19 974 and U.S. Pat. No. 5,219,816.

Particularly advantageous moldings, specifically spinel honeycomb structures, which are free from cracks, possess high mechanical stability and sustained use strength and are impervious to temperature changes, are obtained by extruding molding material comprising spinel powder with or without extrusion assistants, stabilizers, shrinkage reducers, pore-formers, peptizing assistants or mixtures thereof, subsequent drying and calcination of the extrudates, wherein the molding material further comprises aluminum oxides or aluminum oxide hydrates and metal nitrates. Metal nitrates which give an acidic reaction in aqueous solution are preferred. Particular preference is given to copper nitrate. Instead of the preferred $Cu(NO_3)_2.3\ H_2O$ it is also possible to use hydrates containing fewer or more moles of water of crystallization. Moreover, it is also possible to use other metal nitrates provided their cations are spinel-formers and the presence of the resulting metal oxides is desirable in the catalyst.

The molding material is preferably extruded into honeycomb structures, as described at the beginning. Typical honeycomb structures have channels from 1 to 5 mm in diameter and from 0.2 to 5 mm in partition wall thickness.

The extrusion of the molding materials into honeycomb structures can take place at feed speeds of up to 80 cm/min. The drying time at room temperature is generally only about one week. The honeycomb structures obtained are very stable mechanically and with regard to temperature fluctuations. Alternatively, the spinel powder can be applied to moldings from metallic or ceramic fibers or metallic wires or sheets. Such moldings are described for example in WO99/15292, EP-A-0 390 962, U.S. Pat. No. 4,686,202, EP-A-0 564 830 or DE-A-196 41 049.

A multiplicity of spinel powders can be used according to the present invention. Suitable spinel powders are described for example in EP-A-0 676 232, EP-A-0 779 093, DE-A-195 46 482 and also in DE-A-196 53 200, which was unpublished at the priority date.

Spinels are described for example in C. W. Correns, Einführung in die Mineralogie, Springer Verlag 1949, pages 77 to 80. Further descriptions may be found in H. Remy, Lehrbuch der anorganischen Chemie, Akademische Verlagsgesellschaft Geest & Portig K. -G. Leipzig 1950, pages 308 to 311, and also in Roempp, Chemielexikon, 9th edition 1995, page 4245. Spinels are formally derived from $MgAl_2O_4$. Magnesium may be replaced by other divalent ions such as zinc, copper, iron. Aluminum may be replaced by other trivalent ions, such as iron or chromium. In the spinel lattice the oxygen atoms form a cubic close-packed structure corresponding to a face-centered lattice. Half of the octahedral vacancies therein are occupied by aluminum, the other half of the vacancies are empty. One eighth of the tetrahedral vacancies are occupied by magnesium.

Preference is given to using a copper-aluminum spinel powder which may be 0–10% by weight replaced by $ZrO_2$, $CeO_2$, $SnO_2$, $WO_3$, $MoO_3$, $TiO_2$, $V_2O_5$, $La_2O_3$ or mixtures thereof and additionally doped with noble metals.

The spinel powders preferably have a mean particle size of from 0.1 to 50 $\mu$m, particularly preferably of from 1 to 30 $\mu$m, especially of from 2 to 10 $\mu$m. They are obtainable by various processes as exemplified in the references cited above.

The spinel powders may be prepared for example by mixing the pulverulent oxides of the metals present in the spinel, pressing the oxide mixtures, and calcination. The calcination temperature is preferably not less than 700° C. Examples of suitable oxides are $ZrO_2$, $SiO_2$, $Al_2O_3$, $TiO_2$, $CeO_2$, $SnO_2$, $WO_3$, $MoO_3$, $La_2O_3$ and $V_2O_5$.

The preparation may also take the form of mixing with metal salt solutions of the metals present in the spinel, subsequent precipitation, drying and calcination. Instead of a solution it is also possible to use a suspension of the metal salts. Preference is given to using the salts with inorganic acids, such as nitrates, sulfates, carbonates or halides— depending on the solubility. It is also possible to use salts of organic acids. Examples are formates, acetates, propionates, oxalates or citrates. The precipitation may be brought about by addition of precipitants such as ammonia, alkali metal carbonate, basic alkali metal carbonate or hydroxides.

Moreover, the solutions may be dried and pulverized by spray drying or flash evaporation. Drying may be followed by a calcination step at preferably not less than 600° C.

Furthermore, the compounds of the precursor metals of the spinel may be mixed with a carbon and nitrogen source to form a mixture which is then burned. The burning results in high temperatures at which the spinels are formed. Examples of suitable carbon and nitrogen sources are organic compounds such as urea or glycine.

Further suitable manufacturing processes are described in DE-A-42 24 881 for example. For example, metal oxides such as AlOOH (boehmite), CuO, ZnO and optionally further suitable metal oxides may be kneaded with water in the presence of a binder, extruded, dried and calcined, in which case the extrudates obtained may be pulverized. Instead of the metal oxides it is possible to use the corresponding hydroxides, oxide hydrates, carbonates, salts of organic acids, nitrates, chlorides, sulfates or phosphates as described above. To prepare bimodal or polymodal catalysts, AlOOH may be replaced by a mixture of AlOOH and $Al_2O_3$, preferably $\alpha$-or $\gamma$-$Al_2O_3$. $Al_2O_3$ having different pore size distributions may be used for this purpose.

Drying preferably takes place at from 10 to 200° C., particularly preferably at from 20 to 150° C., especially at from 30 to 120° C. Freeze-drying is also possible (for example at from −40 to 0° C., from 0.05 to 0.8 bar). Freeze-drying is particularly gentle, but also more time-consuming. The geometric shape is sufficiently well preserved. Calcination preferably takes place at from 600 to 900° C.

This invention admixes the spinel powder—optionally alongside extrusion assistants, stabilizers, shrinkage reducers, pore-formers, peptizing assistants or mixtures thereof—additionally with aluminum oxides or aluminum oxide hydrates and metal nitrates. Preference is given to using aluminum oxide hydrate and, for example, copper nitrate in a molar ratio of Cu:Al of from 0.3 to 0.7, particularly preferably of from 0.4 to 0.6. The aluminum oxide hydrate used is preferably aluminum oxide hydroxide, aluminum trihydroxide or mixtures thereof. The metal salts may be used in the form of their hydrates. The amount of aluminum oxide hydrate and metal nitrate is preferably within the range from 15 to 55% by weight, based on the amount of spinel powder. The spinel powder is kneaded with the additional constituents into a plastic material, which is then extruded into extrudates, especially honeycomb structures. The extrudate is then preferably dried at from 10 to 200° C., particularly preferably at from 20 to 150° C., especially at from 30 to 120° C., and calcined at from 500 to 900° C.

The mixing ratio of aluminum oxide hydrate to metal nitrate (copper nitrate) is preferably chosen in such a way that it corresponds to the mixing ratio present in a spinel. Based on the spinel powder present, preference is given to adding from 5 to 25% by weight of AlOOH and from 10 to 30% by weight of metal nitrate (e.g., $Cu(NO_3)_2.3\ H_2O$). The molar ratio of metal oxide to $Al_2O_3$ in these spinel precursors should not be significantly substoichiometric. The molar ratio should preferably be within the range from 0.6 to 1.4.

Instead of AlOOH (boehmite) it is also possible to use Al(OH)$_3$ (bayerite or hydrargillite) or other aluminum oxide hydrates and mixtures thereof. For a description of the large number of suitable aluminum oxide hydrates, see Holleman-Wiberg, Lehrbuch der anorganischen Chemie, Walter D. Gruyter Berlin, New York 1985.

Preference is given to using boehmite and copper nitrate having a water content of from 2 to 6 mol.

The spinel powder used may be prepared in various ways. Examples are the coprecipitation from hydroxides with subsequent calcination, the mixing of the oxides and subsequent calcination, the use of old recycled honeycombs, the use of production scrap and residues, the mixing of the salts, spray drying and subsequent calcination.

The extrusion of the molding material into honeycomb structures preferably takes place at a feed speed of up to 80 cm/min. The drying time at room temperature is preferably about one week.

In a further embodiment of the invention, the spinel monolith catalysts are prepared by calcinative coating of a support with the spinel. The support can be for example a monolith composed of an inorganic oxidic material such as cordierite, which is impregnated with the spinel by wash coat, but the support can also be selected from the group consisting of fibers, spall, balls and wire nets, which are molded into the monolith after the calcinative coating.

The invention also provides a process for preparing the foregoing spinel monolith catalysts, and this process comprises carrying out the steps shown.

The impregnating of the monolith with a solution of at least one compound of elements of transition group 5 of the periodic table can be effected according to all known processes, for example by saturating, spraying, etc. The impregnated monolith is then dried and optionally calcined. The calcining is generally carried out at a temperature in the range from 400 to 1000° C., preferably from 500 to 900° C., especially from 600 to 800° C.

The monolith is impregnated in particular by saturating with a solution of the salts of the elements of transition group 5. Preferred elements are niobium and tantalum and also mixtures thereof. The amount of niobium, tantalum or mixtures thereof is preferably from 0.1 to 20% by weight, particularly preferably from 0.1 to 10% by weight, based on the total weight of the catalyst.

The honeycomb structures of the invention are useful as catalysts or catalyst supports for the catalytic cleanup of exit gases comprising nitrogen oxides. They are consequently intended especially for the denoxing of combustion exit gases, preferably diesel exit gases. However, they are also useful for the denoxing of other NO$_x$-comprising exit gases for example from coal-fired, oil-fired or energy-from-waste power plants. Suitable doping will render the honeycomb structures also useful for the cleanup of N$_2$O-comprising industrial exit gases. Similarly, dioxin decomposition is possible given suitable doping with TiO$_2$, V$_2$O$_5$ and WO$_3$, and the dioxin decomposition process may take place simultaneously with or immediately following the denoxing. The dioxin decomposition may preferably take place under oxidizing conditions over a TiO$_2$/V$_2$O$_5$/WO$_3$ catalyst as described in EP-A-0 447 537, for example. Other exit gases comprising polyhalogenated compounds can be cleaned up as well. Particular preference is given to using the honeycomb structures—after noble metal doping especially—as hydrocarbon storage capacity supports for a 3-way catalyst.

The Examples hereinbelow illustrate the invention.

EXAMPLES 400 cpsi copper spinel honeycombs having various wall thicknesses between 180 and 500 μm and square channel cross sections are utilized as catalyst monolith in the Examples.

The honeycomb was subjected to the flow of NO$_x$-containing gas of the following composition: NO$_x$ concentration: 500 ppm; 10% of oxygen, 5% of water, balance nitrogen. The space velocity SV was 50,000 h$^{-1}$.

Comparative Example 1

The above-described copper spinel honeycomb catalyst in undoped form produced on average NO$_x$ degradation of 4.6% at from 200 to 400° C. and of 4.9% at from 400 to 200° C.

Inventive Example 2

The above catalyst was used after saturating with an aqueous solution of niobium oxalate, drying and calcining. The niobium fraction on the copper spinel was 10% by weight, based on the entire catalyst. The average NO$_x$ degradation was 14.6% at from 200 to 400° C. and 10.9% at from 400 to 200° C.

Inventive Example 3

The above copper spinel honeycomb catalyst was used after saturating with an aqueous solution of tantalum chloride, drying and calcining. The tantalum fraction was 10% by weight, based on the entire catalyst. The average NO$_x$ degradation was 13.5% at from 200 to 400° C. and 10.0% at from 400 to 200° C.

The results reveal that the doped spinel honeycomb catalysts provide significantly improved NO$_x$ degradation compared to undoped catalyst.

Inventive Example 4

To demonstrate that the doping with Nb or Ta may also be effected by incorporating the doping compounds in the course of the preparation of the copper spinel powder, one honeycomb each was fabricated according to the above method of preparation, except with the addition of niobium oxalate or tantalum chloride in aqueous solution.

Comparative Example 2

To demonstrate that the doping with Nb or Ta does not work in the case of a copper spinel in spall form, copper spinel in spall form was prepared according to the above method with and without the doping mentioned. It was extruded in strand form, calcined and made into spall having particle diameters of from 0.7 to 1.0 mm. The undoped copper spinel gave NO$_x$ degradation values of 13% in the temperature range 200–400° C. at an SV of 20,000 h$^{-1}$ and 1000 ppm of NO in the feed gas. By contrast, the copper spinel doped with 10% of Nb gave NO$_x$ degradation values of 12%. A copper spinel with 5% tantalum doping produced degradation values of 14%. The accuracy of these values is +/−1.5% abs.

We claim:

1. A spinel monolith catalyst obtained by
   a) preparing or coating a monolith, with an at least surfacial active composition consisting of a spinel of the general formula (I)

$$A_xB_{(1-x)}E_2O_4 \quad (I)$$

where
   A is Cu, of which up to half may be replaced by Co, Fe, Ni, Mn or Cr,
   B is at least one element selected from the group consisting of Zn, Mg, Ca, Zr, Ce, Sn, Ti, V, Mo and W,
   E is Al, of which up to half may be replaced by $Fe_2O_3$, $Cr_2O_3$, $Ga_2O_3$, $La_2O_3$ or mixtures thereof,
   x is from 0 to 1,
   b) impregnating the monolith with a solution of at least one of niobium or tantalum or adding niobium or tantalum in step a) in the form of their oxides or salts,
   c) drying and optionally calcining.

2. A spinel monolith catalyst as claimed in claim 1, wherein the monolith is molded from spinel powder of the spinel of the general formula (I).

3. A spinel monolith catalyst as claimed in claim 1, wherein the monolith is prepared by calcinative coating of a support with the spinel of the general formula (I).

4. A spinel monolith catalyst as claimed in claim 3, wherein the support is a monolith composed of an inorganic oxidic material.

5. A spinel monolith catalyst as claimed in claim 3, wherein the support is selected from the group consisting of fibers, spall, balls and wire nets and is molded into the monolith.

6. A spinel monolith catalyst as claimed in any of claims 1 to 5, wherein A is Cu, B is Zn, Zr, Mg or Ca, E is Al and x is from 0 to 1.

7. A process for preparing a spinel monolith catalyst as claimed in claim 1 consisting of the steps
   a) preparing or coating a monolith, with an at least surfacial active composition consisting of a spinel of the general formula (I)

$$A_xB_{(1-x)}E_2O_4 \quad (I)$$

where
   A is Cu, of which up to half may be replaced by Co, Fe, Ni, Mn or Cr,
   B is at least one element selected from the group consisting of Zn, Mg, Ca, Zr, Ce, Sn, Ti, V, Mo and W,
   E is Al, of which up to half may be replaced by $Fe_2O_3$, $Cr_2O_3$, $Ga_2O_3$, $La_2O_3$ or mixtures thereof,
   x is from 0 to 1,
   b) impregnating the monolith with a solution of at least one of niobium or tantalum or adding niobium or tantalum in step a) in the form of their oxides or salts,
   c) drying and optionally calcining.

8. A spinel monolith catalyst as claimed in claim 1, wherein x is from 0 to 0.9.

9. A process for preparing a spinel monolith catalyst as claimed in claim 7, wherein x is from 0 to 0.9.

* * * * *

UNITED STATES PATENT AND TRADEMARK OFFICE
CERTIFICATE OF CORRECTION

PATENT NO. : 6,524,996 B1 Page 1 of 1
APPLICATION NO. : 09/688881
DATED : February 25, 2003
INVENTOR(S) : Bender et al.

It is certified that error appears in the above-identified patent and that said Letters Patent is hereby corrected as shown below:

Col. 8, claim 6, lines 1-2, "any of claims 1 to 5" should be --claim 1--.

Signed and Sealed this

Twenty-eighth Day of August, 2007

JON W. DUDAS
*Director of the United States Patent and Trademark Office*

UNITED STATES PATENT AND TRADEMARK OFFICE
CERTIFICATE OF CORRECTION

PATENT NO.        : 6,524,996 B1                                                          Page 1 of 1
APPLICATION NO.   : 09/688881
DATED             : February 25, 2003
INVENTOR(S)       : Bender et al.

It is certified that error appears in the above-identified patent and that said Letters Patent is hereby corrected as shown below:

Col. 8, claim 6, lines 1-2, "any of claims 1 to 5" should be --claim 1--.

Signed and Sealed this

Twenty-fifth Day of September, 2007

JON W. DUDAS
*Director of the United States Patent and Trademark Office*